(12) United States Patent
Schulz et al.

(10) Patent No.: US 9,039,906 B2
(45) Date of Patent: May 26, 2015

(54) METHOD FOR PRODUCING AN ANTIREFLECTION COATING

(71) Applicant: Fraunhofer-Gesellschaft zur Förderung der angewandten Forschung e.V., Munich (DE)

(72) Inventors: Ulrike Schulz, Jena (DE); Peter Munzert, Jena (DE); Friedrich Rickelt, Jena (DE); Norbert Kaiser, Jena (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/309,582

(22) Filed: Jun. 19, 2014

(65) Prior Publication Data

US 2014/0374377 A1 Dec. 25, 2014

(30) Foreign Application Priority Data

Jun. 19, 2013 (DE) .......................... 10 2013 106 392

(51) Int. Cl.
*B29D 11/00* (2006.01)
*B29C 59/14* (2006.01)
(Continued)

(52) U.S. Cl.
CPC ................ *G02B 1/111* (2013.01); *B29C 59/14* (2013.01); *C08J 7/123* (2013.01); *G02B 1/118* (2013.01); *G02B 1/12* (2013.01); *B29D 11/00865* (2013.01)

(58) Field of Classification Search
CPC ............... H01L 21/31144; H01L 21/32139; H01L 21/76811; H01L 21/0337; G02B 1/111

USPC .......................................................... 216/24
See application file for complete search history.

(56) References Cited

U.S. PATENT DOCUMENTS

2005/0233083 A1  10/2005  Schulz et al.
2010/0033819 A1  2/2010  Schulz et al.
(Continued)

FOREIGN PATENT DOCUMENTS

DE        10241708 A1   3/2004
DE    102007009512 A1   8/2008
(Continued)

OTHER PUBLICATIONS

Joo, W., et al., "Broadband Antireflection Coating Covering from Visible to Near Infrared Wavelengths by Using Multilayered Nanoporous Block Copolymer Films," Langmuir Article, vol. 26, No. 7, Dec. 3, 2009, pp. 5110-5114.
(Continued)

*Primary Examiner* — Roberts Culbert
(74) *Attorney, Agent, or Firm* — Slater & Matsil, L.L.P.

(57) ABSTRACT

A method for producing an antireflection coating on a substrate is specified. A first nanostructure in a first material is formed using by means of a first plasma etching process. The first material is the material of the substrate or the material of a layer made of a first organic material applied onto the substrate. A layer made of a second material is applied onto the first nanostructure, the second material is an organic material. A second nanostructure is formed in the layer made of the second material using a second plasma etching process. The second material has a higher etching rate than the first material when carrying out the second plasma etching process.

15 Claims, 7 Drawing Sheets

(51) Int. Cl.
*C08J 7/12* (2006.01)
*G02B 1/12* (2006.01)

(56) References Cited

U.S. PATENT DOCUMENTS

2011/0019277 A1 1/2011 Sager et al.
2011/0051246 A1 3/2011 Schulz et al.

FOREIGN PATENT DOCUMENTS

DE 102008018866 A1 10/2009
DE 202011110173 U1 3/2013
WO 2012020295 A1 2/2012

OTHER PUBLICATIONS

Kaless, A., et al., "Nano-motheye antireflection pattern by plasma treatment of polymers," Elsevier, Surface & Coatings Technology, vol. 200, Mar. 5, 2005, pp. 58-61.
Kennedy, S.R., et al., "Porous broadband antireflection coating by glancing angle deposition," Applied Optics, vol. 42, No. 22, Aug. 1, 2003, pp. 4573-4579.
Wendling, I., et al., "Creating Anti-Reflective Nanostructures on Polymers by Initial Layer Deposition before Plasma Etching," Wiley InterScience, Plasma Processes and Polymers, vol. 6, Jun. 2009, pp. S716-S721.

METHOD FOR PRODUCING AN ANTIREFLECTION COATING

This application claims priority to German Patent Application 10 2013 106 392.6, which was filed Jun. 19, 2013 and is incorporated herein by reference.

TECHNICAL FIELD

The invention relates to a method for producing an antireflection coating on a substrate, in particular embodiments, on a curved glass or plastic substrate for optical applications.

BACKGROUND

For the antireflection property of surfaces, in particular of optical elements or displays, use is conventionally made of reflection-reducing interference layer systems, which contain a plurality of alternating layers made of high refractive index and low refractive index materials. Currently, use is made of $MgF_2$ with n=1.38 as material with a particularly low refractive index in the visible spectral range. The antireflection effect of conventional dielectric layer systems could be improved if materials with a lower refractive index were available.

An alternative option for reducing the reflection of an optical element is known from the German patent document DE 10241708 B4 and U.S. counterpart publication 2005/0233083. In this method, a nanostructure, which reduces the reflection of the plastic substrate, is generated on the surface of a plastic substrate by means of a plasma etching process. The antireflection property of an optical element by generating a nanostructure on the surface thereof is advantageous in that a low reflection is obtained over a broad angle-of-incidence range.

German Patent Document DE 102008018866 A1 and U.S. counterpart publication 2011/0051246 describes a reflection-reducing interference layer system onto which an organic layer, which is provided with a nanostructure by means of a plasma etching process, is applied.

However, plasma-etched nanostructures only achieve a depth of 100 nm to 200 nm in most materials. Such a thickness suffices for planar and slightly curved surfaces for providing a substrate with such an antireflection property in the visual spectral range from 400 nm to 700 nm for angles of incidence of light between 0° (perpendicular light incidence) and 60° that the residual reflection is only approximately 1%. However, in part, there is a demand for broadband antireflection properties which are intended to work over even larger angle of incidence ranges of light.

The production of an antireflection coating on low refractive index (n<1.7), highly curved surfaces is particularly problematic. A layer deposited by a directed vacuum coating process such as sputtering or vapor deposition has a thickness at the location at which it grows which depends on the angle of the incident vapor. The layer thickness reduces with increasing angle of incidence. Therefore, the physical thickness d of all layers in an interference layer system reduces with increasing angle of incidence. However, the optical thickness n*d, where n is the refractive index, is important for the optical function. The refractive index n is different in the layer systems consisting of high refractive index and low refractive index materials such that there is an additional change in the optical function in the case of varying thickness. As a result of this problem, the residual reflection of antireflection coatings generally has undesired high values in the edge region of lenses.

An improvement could be obtained if it were possible to produce a low refractive index gradient layer with such thickness that a reduction in thickness of at least 50% is tolerated. The technical implementation on high refractive index substrates (n>1.7) is easier than on the conventional low refractive index glasses since a layer design in which the refractive index gradually reduces can already be implemented by natural materials.

There are only few technical possibilities for producing relatively thick layers with an effective refractive index <1.38. The document W. Joo, H. J. Kim and J. K. Kim, "Broadband Antireflection Coating Covering from Visible to Near Infrared Wavelengths by Using Multilayered Nanoporous Block Copolymer Films", Langmuir 26(7), 2010, 5110-5114, describes the production of a thick gradient layer by means of sol-gel processes, wherein, however, the deposition on curved surfaces may be difficult in this case.

A vacuum-technical method for producing multilayer gradient layers is known from the document S. R. Kennedy, M. J. Brett, "Porous Broadband Antireflection Coating by Glancing Angle Deposition", Appl Opt. 42, 4573-4579, 2003. Here, oxides or fluorides are vapor deposited onto the substrate at glancing angle. Porous layers are likewise created here as a result of shadowing effects. Thus, for this reason, the substrate needs to be positioned obliquely with respect to the angle of incidence of vapor. However, there would be additional shadowing effects as a result of the lens geometry on a strongly curved surface, and so the method cannot readily be applied to curved lenses.

SUMMARY

Embodiments of the invention specify an improved method for producing an antireflection coating, by means of which various surfaces can be provided with an antireflection property in a broadband and angle-independent manner. The method should be particularly suitable for low refractive index glasses and plastics with a refractive index n<1.7 and for strongly curved surfaces.

BRIEF DESCRIPTION OF THE DRAWINGS

In the following text, the invention is explained in more detail in conjunction with FIGS. 1 to 8.

In detail.

Figure 1:
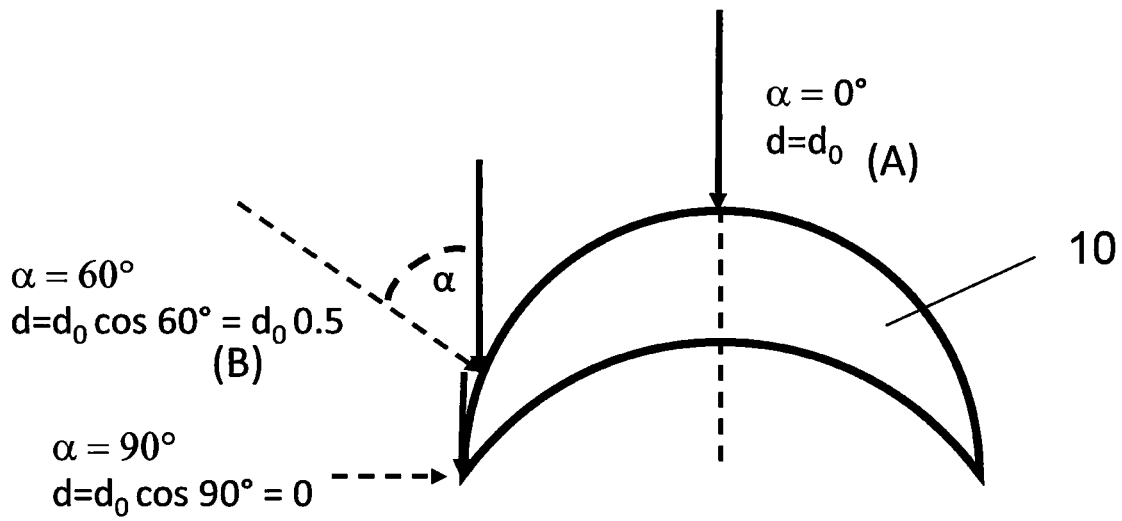
FIG. 1 shows a schematic illustration of a lens with a spherical surface, acting as a substrate, with an illustration of the change in the layer thickness in the case of different angles of incidence of vapor.

Identical or identically acting component parts are provided with the same reference signs in each case in the figures. The illustrated component parts and the size relationships of the component parts among one another should not be regarded as true to scale.

DETAILED DESCRIPTION OF ILLUSTRATIVE EMBODIMENTS

In a method for producing an antireflection coating on a substrate, a first nanostructure is generated in a first material by means of a first plasma etching process. The first material can be the material of the substrate or, alternatively, the material of a layer made of a first organic material applied onto the substrate. As a result of the first plasma etching process, a refractive index gradient is advantageously generated in the first material, wherein the refractive index reduces in a direction extending from the substrate to the surface.

In a further method step, a layer made of a second organic material is applied onto the first nanostructure generated by the first plasma etching process. A second nanostructure is subsequently generated in the layer made of the second organic material by means of a second plasma etching process. In this manner, a refractive index gradient is advantageously generated in the layer made of the second organic material, wherein the refractive index reduces in a direction extending from the substrate to the surface.

In the method, the second material advantageously has a higher etching rate than the first material when carrying out the second plasma etching process. An advantage of this is that the previously generated first nanostructure is not, or only hardly, influenced when the second plasma etching process is carried out.

In the method described herein for producing an antireflection coating, a layer made of a second organic material is advantageously placed over the first nanostructure, which was generated by means of the first plasma etching process and which embodies a first refractive index gradient layer, wherein a second nanostructure, which embodies a second refractive index gradient layer, is formed by means of a second plasma etching process in the second organic material. In this manner, it is advantageously possible to generate a comparatively thick refractive index gradient layer formed from two partial layers, which refractive index gradient layer provides a very good antireflection property in a large angle range, even on curved substrates. The overall thickness of the refractive index gradient layer formed by the first nanostructure and the second nanostructure is preferably at least 250 nm.

In an advantageous configuration, the first nanostructure generated in the first plasma etching process has a depth of between 100 nm and 200 nm. In other words, the nanostructure extends up to a depth of between 100 nm and 200 nm into the substrate or into the layer made of the first material applied onto the substrate.

The first nanostructure advantageously has a mean effective refractive index $n_1$ of between 1.25 and 1.4. Here, and in the following text, the effective refractive index should be understood to mean the refractive index averaged over the nanostructure, the value of which refractive index advantageously being lower than the refractive index of a continuous layer made of the first material as a result of the recesses generated by the nanostructure.

In accordance with a preferred configuration, the layer made of the second organic material is applied with a layer thickness of between 200 nm and 400 nm onto the first nanostructure. In the case of a layer thickness in this range, the layer made of the second organic material, firstly, is thick enough for it to be possible to generate a sufficiently deep nanostructure therein and, secondly, it is thin enough for it to be possible to generate a refractive index gradient therein, which refractive index gradient reaches the region of the interface to the first nanostructure.

The second nanostructure, like the first nanostructure, advantageously has a depth of between 100 nm and 200 nm.

The mean effective refractive index $n_2$ of the second nanostructure is preferably smaller than the mean effective refractive index $n_1$ of the first nanostructure. Preferably, the second nanostructure has a mean effective refractive index $n_2$ in the range of between 1.08 and 1.25. Therefore, the second nanostructure advantageously has an effective refractive index which is even lower than the effective refractive index of the first nanostructure and, in particular, is so low that it could not be achieved by means of a homogeneous layer.

The first and the second nanostructure preferably each have structure elements in the form of elevations, recesses or pores, the width of which on average is less than 150 nm, preferably between 20 nm and 120 nm.

In a preferred configuration of the method, an etch stop layer is applied onto the first nanostructure before applying the layer made of the second organic material. The etch stop layer advantageously prevents parts of the first nanostructure from being removed when carrying out the second plasma etching process. The etch stop layer preferably has a thickness of no more than 30 nm. An advantage of such a low thickness of the etch stop layer is that the effective refractive index in the boundary region between the first nanostructure and the second nanostructure is only influenced insubstantially. By way of example, the etch stop layer can be a $SiO_2$ layer.

In a further advantageous configuration of the method, a protection layer is applied onto the second nanostructure after generating the second nanostructure. By way of example, the protection layer is an inorganic layer such as, in particular, a $SiO_2$ layer. Advantageously, the protection layer has a thickness of no more than 30 nm. An advantage of this is that the refractive index on the surface of the second nanostructure is only influenced insubstantially by the protection layer.

A multiplicity of materials, in which a nanostructure can be generated by means of a plasma etching process, are advantageously suitable for the first material or the second material. The first material and/or the second material preferably contains one of the following materials: 2,4,6-triamino-1,3,5-triazine (melamine), 2,2'-methylenebis(6-(2H-benzotriazol-2-yl)-4-1,1,3,3-tetramethylbutyl)phenol (MBP), N,N'-bis(3-methylphenyl)-N,N-diphenylbenzidine (TPD), N,N'-di(naphth-1-yl)-N,N'-diphenylbenzidine (NPB), N,N,N',N'-tetraphenylbenzidine (TPB), tris(4-carbazoyl-9-ylphenyl)amine (TCTA), 5,5'-di(4-biphenylyl)-2,2'-bithiophene (B2TP), 2,3-dihydro-1,4-phthalazinedione, pentacene, HMDSO, allylamine, allyl alcohol, vinyl acetate, styrene, parylene, Ormocer, polyurethane, polysiloxane resist, acrylic resist, silicone, PMMA, polycarbonate, a cycloolefin (e.g., Zeonex, COC or APEL), polyamide, PTFE.

In one embodiment of the invention, the first material is the material of the substrate. In this embodiment, the first nanostructure is generated in the surface of the substrate. This supposes that the material of the substrate can be structured by means of a plasma etching process. In this embodiment, the substrate advantageously has a first organic material. In particular, the substrate can have PMMA, polycarbonate, cycloolefin, polyamide or PTFE.

In an alternative embodiment, the first material is the material of a layer made of a first organic material applied onto the substrate. In this embodiment, the first nanostructure is not generated in the surface of the substrate, but rather in the first organic layer applied onto the substrate. This embodiment is then advantageous, in particular, if the material of the substrate cannot be structured, or can only be structured with difficulties, by means of a plasma etching process. By way of example, the substrate can comprise a glass, in particular quartz glass, in this embodiment.

If the first nanostructure is produced in a first organic layer applied onto the substrate, one or more inorganic layers can be applied onto the substrate before applying the first organic layer. The at least one inorganic layer can, in particular, be an oxide, nitride or fluoride layer, or contain mixtures of these materials.

The method is suitable, in particular, for producing antireflection coatings on curved substrates. In particular, the method can be used to generate an antireflection coating which only has a very small residual reflection, even for large angles of incidence in the case of a curved substrate.

Furthermore, the method is advantageous in that a broadband and largely angle-independent antireflection property can be achieved on substrates which themselves already have a comparatively low refractive index. In particular, the substrate can have a refractive index $n_s < 1.7$.

FIG. 1 schematically depicts a spherical lens which is intended to be provided with an antireflection coating. Therefore, the spherical lens acts as substrate 10 for the antireflection coating. By way of example, the lens is a glass lens with a refractive index of $n_s=1.53$. When a layer is deposited on the curved surface of the lens by means of a directed vacuum coating process, such as, e.g., sputtering or vapor deposition, the lens has a thickness at the location at which it grows which depends on the angle of the incident vapor. It is well known that the following applies for the layer thickness d as a function of the angle of incidence of vapor $\alpha$ on the lens: $d(\alpha) = d_0 * \cos \alpha$. Here, $d_0$ is the layer thickness at the center of the lens (perpendicular incidence of vapor). Therefore, in the case of a perfect hemisphere, the layer thickness at the outermost edge is 0 nm; at least theoretically, no layer is deposited. At a point B of the lens, which has an angle of incidence of vapor $\alpha=60°$, the reduction in layer thickness is already 50% compared to the center point A of the lens, at which the vapor is incident perpendicularly ($\alpha=0°$).

Figure 2:
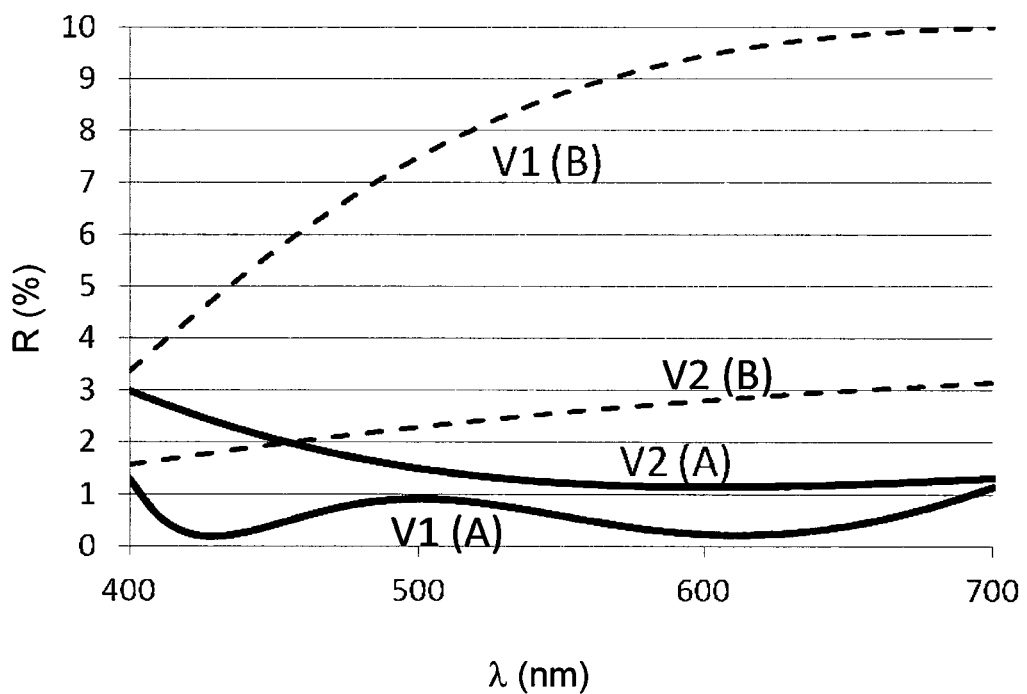
FIG. 2 shows a graph of reflection spectra at positions A and B of the lens shown in FIG. 1, for a conventional interference layer system made of 4 layers (V1) and for a single layer made of $MgF_2$ (V2)

FIG. 2 clarifies the influence of the reduction in layer thickness toward the edge of the lens for non-inventive comparison examples of conventional antireflection coatings.

The reflection R is plotted as a function of the wavelength $\lambda$ at points A and B of the lens, shown in FIG. 1, for a conventional interference layer system made of four layers (V1) and for a single layer made of $MgF_2$ (V2). The graph clarifies that, at the center point A of the lens, a lower residual reflection can be achieved with the interference layer system V1 made of four layers than with the individual layer V2. At point B, at which the layer thickness has been reduced by 50%, the individual layer V2 achieves a lower residual reflection R and hence a better antireflection property. In other words, the multi-layer interference layer system has a lower tolerance for changes in the layer thickness than the individual layer. It is intended that an antireflection coating is produced by means of the method according to the invention, which antireflection coating has a particularly low residual reflection both in the case of perpendicular incidence of light and in the case of glancing incidence of light.

FIGS. 3A to 3F depict a first exemplary embodiment of the method for producing an antireflection coating, on the basis of intermediate steps.

Figure 3A:
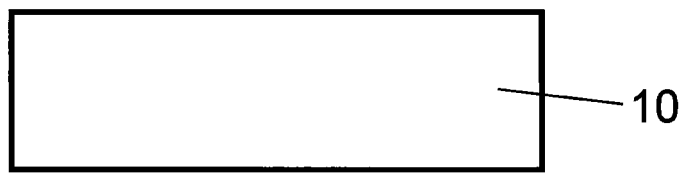
FIGS. 3A to 3F show a schematic illustration of a first exemplary embodiment of the method for producing an antireflection coating, on the basis of intermediate steps.

In the exemplary embodiment of the method, the substrate 10 depicted in FIG. 3A is provided with an antireflection coating. In the depicted exemplary embodiment, the substrate 10 is a planar substrate. Alternatively, the substrate 10 in the method could, in particular, be a curved substrate, such as, e.g., the spherical lens depicted in FIG. 1.

Figure 3B:
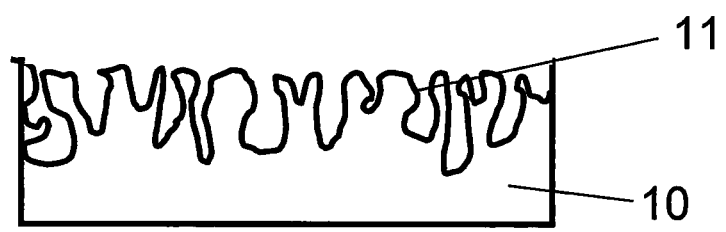

In the intermediate step depicted in FIG. 3B, the substrate 10 has been provided with a first nanostructure 11 by means of a first plasma etching process. This assumes that the substrate 10 comprises a material which can be structured by means of a plasma etching process. In this configuration, the substrate 10 preferably comprises a first organic material, which can, in particular, be one of the following polymers: PMMA, polycarbonate, cycloolefin, polyamide or PTFE. During the plasma etching process, the surface of the substrate 10 is, for example, bombarded by ions by means of a plasma ion source in order to generate the first nanostructure 11. Such a plasma etching process is known per se from the documents DE 10241708 B4 or DE 102008018866 A1, cited in the introductory part of the description, and is therefore not explained in any more detail.

Before carrying out the plasma etching process, a thin initial layer (not depicted here) can be applied onto the surface to be structured, which initial layer preferably has a thickness of only approximately 2 nm. The initial layer is preferably a thin oxide layer, nitride layer or fluoride layer. This procedure is known per se from the document DE 102008018866 A1.

The first nanostructure 11 has a multiplicity of structure elements in the form of elevations, recesses or pores, which advantageously have a width of no more than 150 nm, particularly preferably between 20 nm and 120 nm. The first nanostructure generates a refractive index gradient which decreases in a direction pointing from the substrate 10 to the surface. The mean effective refractive index of the first nanostructure 11 is preferably between 1.25 and 1.40.

Figure 3C:
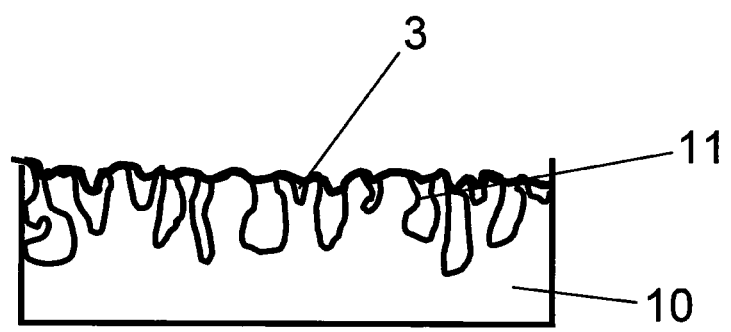

In one configuration of the method, as depicted in FIG. 3C, an etch stop layer 3 is applied onto the first nanostructure 11. The etch stop layer 3 is preferably a very thin inorganic layer, which preferably has a thickness of less than 30 nm. The low thickness of the etch stop layer is advantageous in that the refractive index gradient generated by means of the first nanostructure 11 is only influenced insubstantially. By way of example, the etch stop layer 3 can be a $SiO_2$ layer.

Figure 3D:
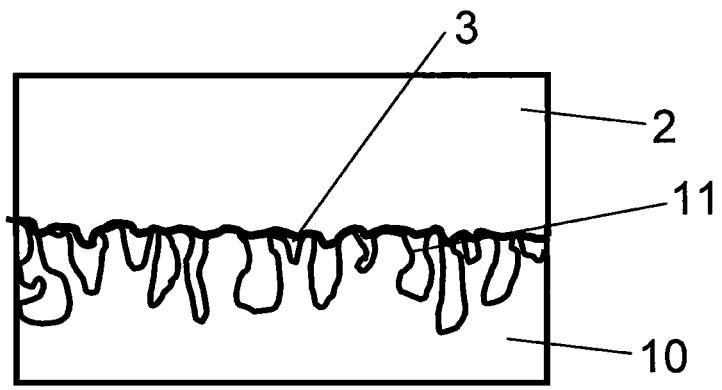

In the further intermediate step depicted in FIG. 3D, a layer 2 made of a second organic material is applied onto the first nanostructure 11. The layer 2 made of the second organic material preferably has a thickness of between 200 nm and 400 nm.

Figure 3E:
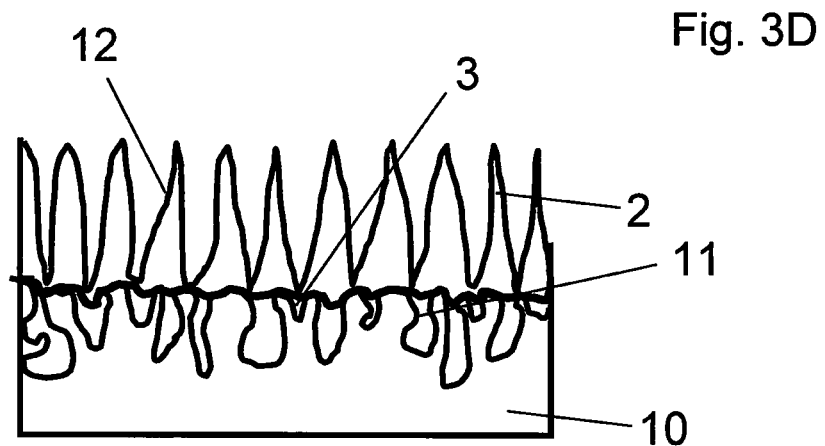

In the intermediate step depicted in FIG. 3E, a second nanostructure 12 has been generated in the layer 2 made of the second organic material by means of a second plasma etching process. Here, the layer 2 is advantageously structured in such a way that the effective refractive index thereof decreases in the direction pointing from the substrate 10 to the surface. The mean effective refractive index of the layer 2 provided with the nanostructure 12 is preferably between 1.08 and 1.25. Therefore, the mean refractive index of the nanostructured layer 2 is advantageously even smaller than the mean effective refractive index of the first nanostructure 11 generated in the surface of the substrate 10.

The refractive index gradient layer, formed by the first nanostructure 11, in the substrate 10 is therefore followed by a second refractive index gradient layer, formed by the second nanostructure 12, in which second refractive index gradient layer the refractive index falls to an even lower value. Preferably, the refractive index falls in the direction from the substrate 10 to the surface in the whole region of the first nanostructure 11 and of the second nanostructure 12. Thus, a refractive index gradient layer, which overall is very thick, is generated, which brings about a particularly good antireflection property over a large angle and wavelength range. In particular, it was found that the antireflection coating produced by the method also brings about a very good antireflection property right up to the edge regions of the substrate, even in the case of curved substrates, since the antireflection coating produced by the method is comparatively tolerant with respect to changes in the layer thickness.

Figure 3F:
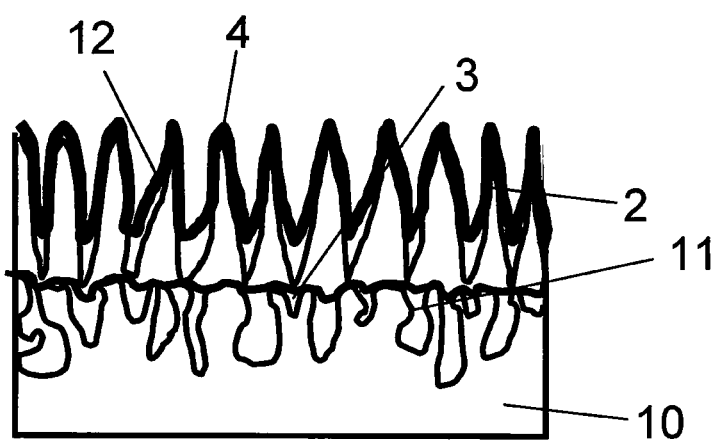

In an advantageous configuration of the method, as depicted in FIG. 3F, a protection layer 4 is applied onto the second nanostructure 12. The protection layer 4 preferably has a thickness of less than 30 nm and can, for example, be a $SiO_2$ layer. In particular, the protection layer 4 serves to protect the nanostructure 12 consisting of an organic material from external influences, in particular from mechanical damage.

Figure 4A:
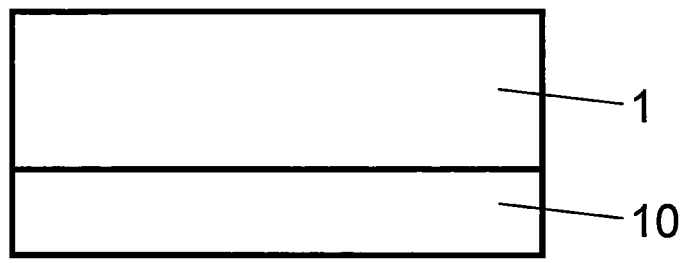
FIGS. 4A to 4F show a schematic illustration of a second exemplary embodiment of the method for producing an antireflection coating, on the basis of intermediate steps.

The second exemplary embodiment of the method for producing an antireflection coating, depicted in FIGS. 4A to 4F, differs from the first exemplary embodiment described above by virtue of a layer 1 made of a first organic material being applied onto the substrate 10 in a first method step depicted in FIG. 4A.

Figure 4B:
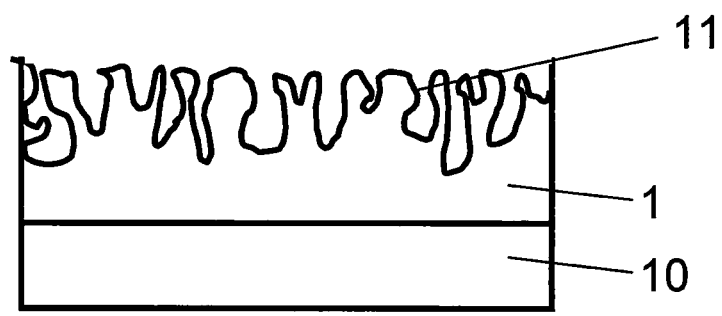
Figure 4C:
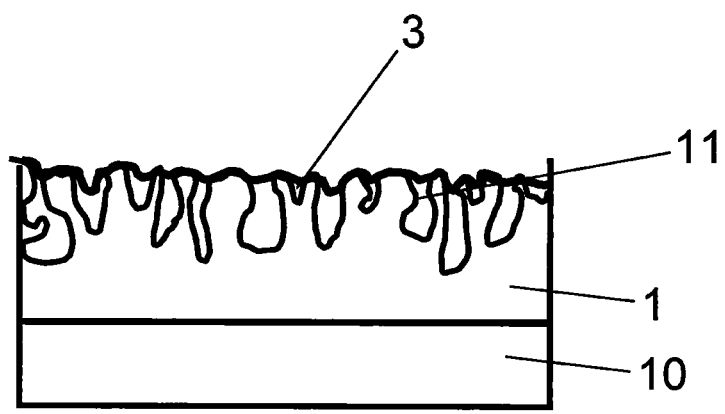
Figure 4D:
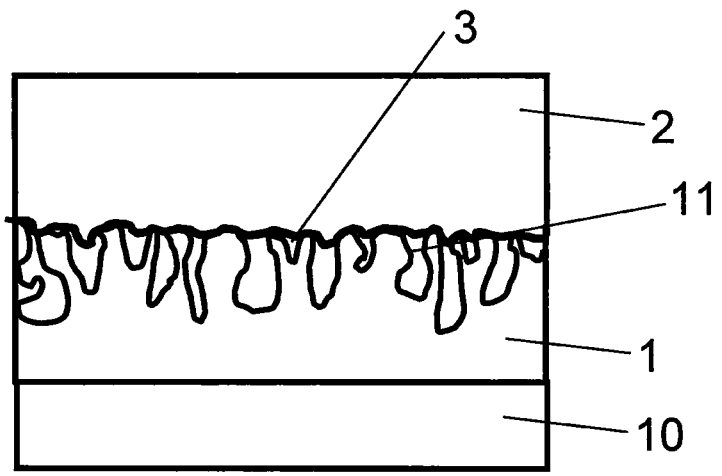
Figure 4E:
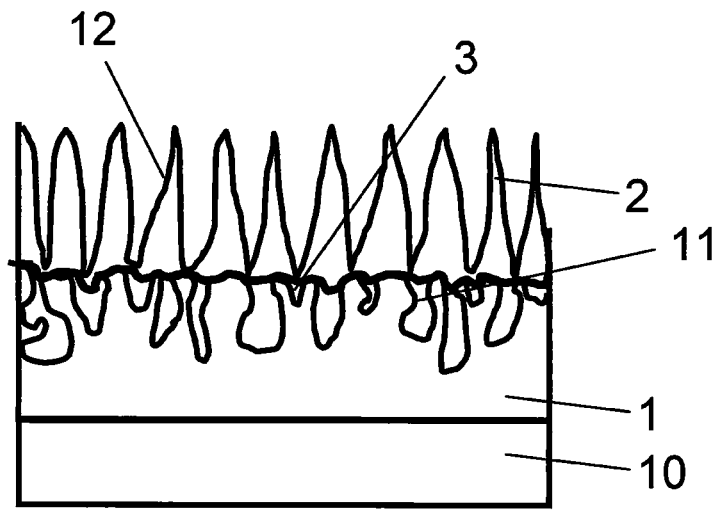
Figure 4F:
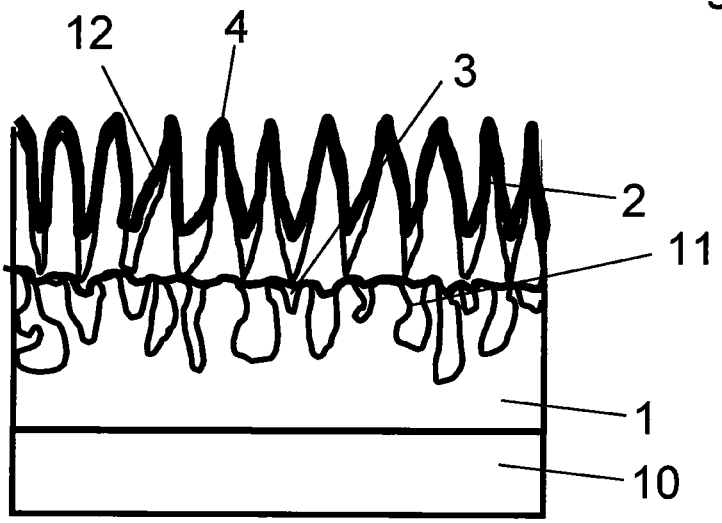

In the method step of producing the first nanostructure 11 by means of a first plasma etching process, depicted in FIG. 4B, the first nanostructure 11 is not generated in the surface of the substrate 10, but rather in the previously applied layer 1 made of the first organic material. This embodiment of the method is then advantageous, in particular, if the substrate 10 consists of a material which itself cannot be structured, or can only be structured with difficulties, by means of a plasma etching process. In this embodiment, the substrate 10 can comprise, e.g., a glass, in particular quartz glass.

The further method steps depicted in FIGS. 4C to 4F correspond to the method steps of the first exemplary embodiment, explained above in conjunction with FIGS. 3C to 3F. Therefore, these are not explained again.

The following table 1 shows an overview of various designs D1 to D5 for exemplary embodiments of the antireflection coating.

|  | D1 | D2 | D3 | D4 | D5 |
|---|---|---|---|---|---|
| substrate (lens) | glass (BK7) | Cycloolefin polymer (Zeonex) | quartz glass (Suprasil) | glass (LAK-9) | glass (BK7) |
| $SiO_2$ (n = 1.46) | 85 nm |  |  | 110 nm | 110 nm |
| first nanostructure ($n_1$ = 1.3) | 120 nm | 120 nm | 120 nm | 120 nm | 120 nm |
| second nanostructure ($n_2$ = 1.1) | 130 nm | 140 nm | 140 nm | 140 nm | 140 nm |

In designs D1 and D5, a lens, as depicted in FIG. 1, is used as a substrate in each case. The designs were calculated for various substrate materials which are specified in the table. In designs D1, D4 and D5, a $SiO_2$ layer is arranged in each case between the substrate and the first nanostructure, the thickness of which layer is specified in the table. Furthermore, the table specifies the structure depths of the first and the second nanostructure.

In the following table 2, the residual reflection RR, obtainable at points A and B of the lens depicted in FIG. 1, is specified for designs D1 to D5 in accordance with exemplary embodiments, for a comparison example V1 (interference layer system made of 4 layers) and for a comparison example V2 (individual layer made of $MgF_2$). The specified residual reflection is averaged over the wavelength range from 400 nm to 700 nm and specified for perpendicular light incidence (angle of incidence 0°).

|  | D1 | D2 | D3 | D4 | D5 | V1 | V2 |
|---|---|---|---|---|---|---|---|
| lens | glass (BK7) | Cycloolefin polymer (Zeonex) | quartz glass (Suprasil) | glass (LAK-9) | glass (BK7) | glass (BK7) | glass (BK7) |
| RR (A)(%) | 0.08 | 0.2 | 0.2 | 0.3 | 0.06 | 0.5 | 1.6 |
| RR (B)(%) | 0.2 | 0.5 | 0.52 | 0.2 | 0.27 | 8.5 | 2.5 |

In one exemplary embodiment of the method, an antireflection coating in accordance with design D2 was produced. The sequence of the method corresponds to that of FIGS. 3A to 3F. Here, a plastic lens 10 made of the cycloolefin polymer obtainable under the brand name Zeonex E48R was provided with an antireflection coating. To this end, a 2 nm-thick initial layer made of $Ta_2O_5$ was first of all vapor deposited in a vacuum vapor deposition machine of the type APS 904 (Leybold Optics). Subsequently, the first nanostructure 11 was generated by a first plasma etching process by means of a plasma ion source of the vacuum vapor deposition machine. For generating the plasma, argon was introduced with a flow rate of 13 sccm and oxygen was introduced with a flow rate of 30 sccm. The plasma ion source was operated with a bias voltage, which is a measure for the energy of the ions incident on the surface, of 120 V and a discharge current of 50 A. During an etching time of 250 seconds, a first nanostructure 11 was generated in the substrate 10, which has structures with a depth of 120 nm and an effective refractive index of $n_1$=1.30.

Subsequently, an etch stop layer 3, which is a 15 nm-thick $SiO_2$ layer, was vapor deposited. In the next step, a 250 nm-thick melamine layer 2 was deposited in the same vacuum process by thermal evaporation with a rate of 0.3 nm/s. Here, the layer thickness was monitored by means of a vibrating quartz measurement system, in which the increase in mass is detected. Subsequently, a second plasma etching process was carried out for generating a second nanostructure 12 in the melamine layer. The second plasma etching process was carried out at a lower ion energy of at most 80 eV. Under these conditions, an etching rate of approximately 0.8 nm/s is achieved in the case of melamine, while the first nanostructure 11 in the substrate 10 made of Zeonex would only have an etching rate of 0.3 nm/s. The second nanostructure 12, the effective refractive index of which is approximately $n_2$=1.1, was generated in an etching time of 300 s. Finally, a 20 nm $SiO_2$ layer was applied as protection layer 4 onto the second nanostructure 12 by means of electron beam evaporation. In this manner, a first nanostructure 11 with a depth of 120 nm was generated in the substrate 10 and a second nanostructure 12 with a depth of 140 nm was generated in the melamine layer 2.

In a development of the exemplary embodiment described above, a planar plastic substrate 10 made of the cycloolefin polymer obtainable under the brand name Zeonex E48R was provided with an antireflection coating. To this end, a 2 nm-thick initial layer made of $TiO_2$ was first of all vapor deposited in a vacuum vapor deposition machine of the type APS 904 (Leybold Optics). Subsequently, the first nanostructure 11 was generated by a first plasma etching process by means of a plasma ion source of the vacuum vapor deposition machine. For generating the plasma, argon was introduced with a flow rate of 13 sccm and oxygen was introduced with a flow rate of 30 sccm. The plasma ion source was operated with a bias voltage, which is a measure for the energy of the ions incident on the surface, of 120 V and a discharge current of 50 A. During an etching time of 200 seconds, a first nanostructure 11 was generated in the substrate 10.

Subsequently, an etch stop layer 3, which is a 25 nm-thick $SiO_2$ layer, was vapor deposited. In the next step, a 250 nm-thick melamine layer 2 was deposited in the same vacuum process by thermal evaporation with a rate of 0.3 nm/s. Here, the layer thickness was monitored by means of a vibrating quartz measurement system, in which the increase in mass is detected. Subsequently, a 2 nm-thick initial layer made of $TiO_2$ was vapor deposited.

Figure 5:
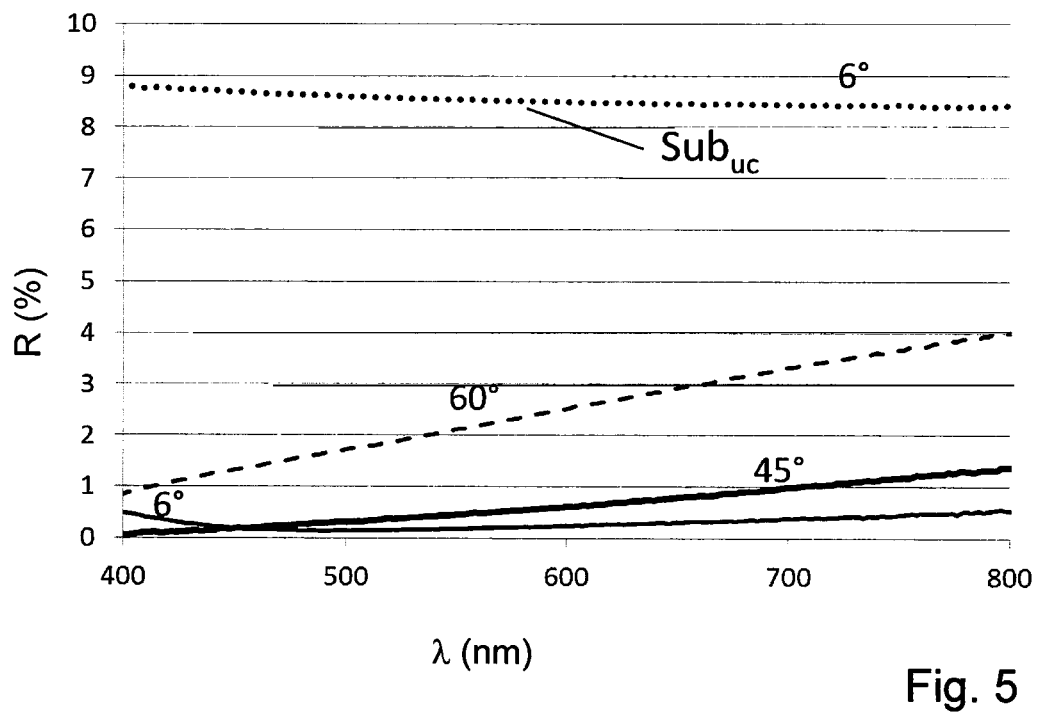
FIG. 5 shows a graph of reflection spectra for an exemplary embodiment of the antireflection coating on a planar substrate at various angles of incidence of light, and for a non-coated comparison substrate.

Subsequently, a second plasma etching process was carried out for generating a second nanostructure 12 in the melamine layer. The second plasma etching process was carried out at a lower ion energy of at most 110 eV. Under these conditions, an etching rate of approximately 1 nm/s is achieved in the case of melamine, while the first nanostructure 11 in the substrate 10 made of Zeonex would only have an etching rate of 0.3 nm/s. The second nanostructure 12 was generated in an etching time of 200 s. Finally, a 20 nm $SiO_2$ layer was applied as protection layer 4 onto the second nanostructure 12 by means of electron beam evaporation. In this manner, a first nanostructure 11 with a depth of 100 nm was generated in the substrate 10 and a second nanostructure 12 with a depth of 130 nm was generated in the melamine layer. FIG. 5 shows the reflection spectra of this sample, measured for angles of incidence of 6°, 45° and 60°, compared to the reflection spectrum at an angle of incidence of 6° of an uncoated substrate ($Sub_{uc}$).

In a further exemplary embodiment of the method, an antireflection coating in accordance with design D1 was produced. The sequence of the method corresponds to FIGS. 4A to 4F. Here, an optical lens made of glass obtainable under the brand name BK7 is used as substrate 10. First of all, an 85 nm-thick $SiO_2$ layer and, thereupon, a 150 nm-thick organic layer 1 made of MBP was initially vapor deposited in a vacuum vapor deposition machine of the type APS 904 (Leybold Optics). The layer thickness was monitored by means of a vibrating quartz measurement system, in which the increase in mass is detected. Subsequently, the first nanostructure 11 in the first organic layer 1 made of the material MBP was generated by a first plasma etching process by means of a plasma ion source of the vacuum vapor deposition machine. To this end, initially, a 2 nm-thick initial layer made of $TiO_2$ was vapor deposited and subsequently etching was carried out in an argon/oxygen plasma by means of the plasma ion source. The plasma ion source was operated with a bias voltage, which is a measure for the energy of the ions incident on the surface, of 120 V and a discharge current of 50 A. During an etching time of 550 seconds, a first nanostructure 11 was generated in the organic layer 1 made of MBP, which has structures with a depth of 120 nm and an effective refractive index of $n_1$=1.30.

In the next step, a 250 nm-thick melamine layer 2 was deposited in the same vacuum process by thermal evaporation with a rate of 0.3 nm/s. Here, the layer thickness was monitored by means of a vibrating quartz measurement system, in which the increase in mass is detected. Subsequently, a second plasma etching process was carried out for generating a second nanostructure 12 in the melamine layer. The second plasma etching process was carried out at a lower ion energy of at most 80 eV. Under these conditions, an etching rate of approximately 0.8 nm/s is achieved in the case of melamine, while the first nanostructure 11 in the first organic layer 1 made of MBP would only have an etching rate of less than 0.1 nm/s. The second nanostructure 12, the effective refractive index of which is approximately $n_2$=1.1, was generated in an etching time of 150 s. Finally, a 20 nm $SiO_2$ layer was applied as protection layer 4 onto the second nanostructure 12 by means of electron beam evaporation. In this manner, a first nanostructure 11 with a depth of 120 nm was generated in the first organic layer 1 and a second nanostructure 12 with a depth of 140 nm was generated in the second organic layer 2 made of melamine.

Figure 6:
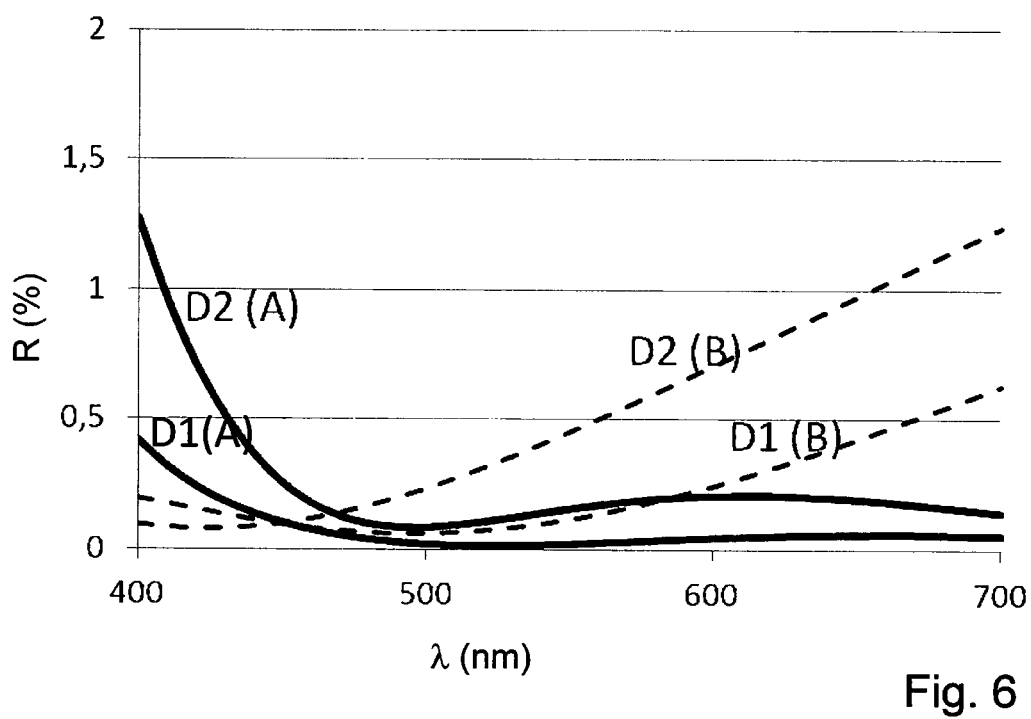
FIG. 6 shows a graph of reflection spectra at positions A and B of the lens shown in FIG. 1, for two exemplary embodiments of the antireflection coating.

FIG. 6 plots the reflection R as a function of the wavelength λ at positions A and B of the lens, for design D1 (substrate made of BK7 glass, $n_s$=1.53) and design D2 (substrate made of the cycloolefin polymer Zeonex, $n_s$=1.53).

Figure 7:
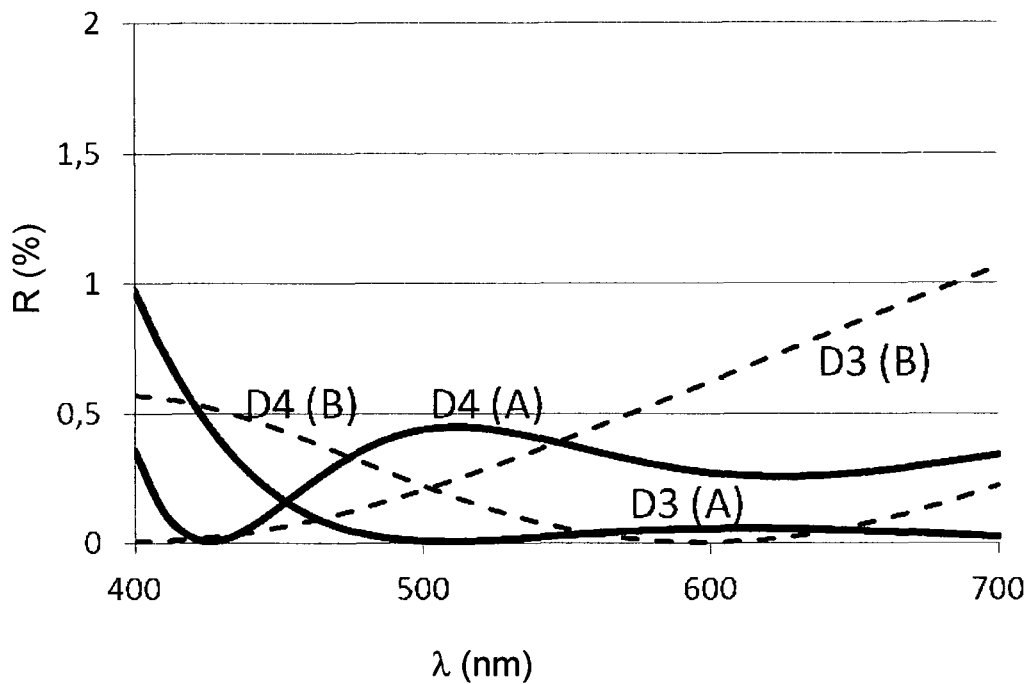
FIG. 7 shows a graph of reflection spectra at positions A and B of the lens shown in FIG. 1, for two further exemplary embodiments of the antireflection coating.

FIG. 7 plots the reflection R as a function of the wavelength λ at positions A and B of the lens, for design D3 (substrate made of quartz glass with $n_s$=1.47) and design D4 (substrate made of a high refractive index glass with the brand name LAK-9, with $n_s$=1.7).

Figure 8:
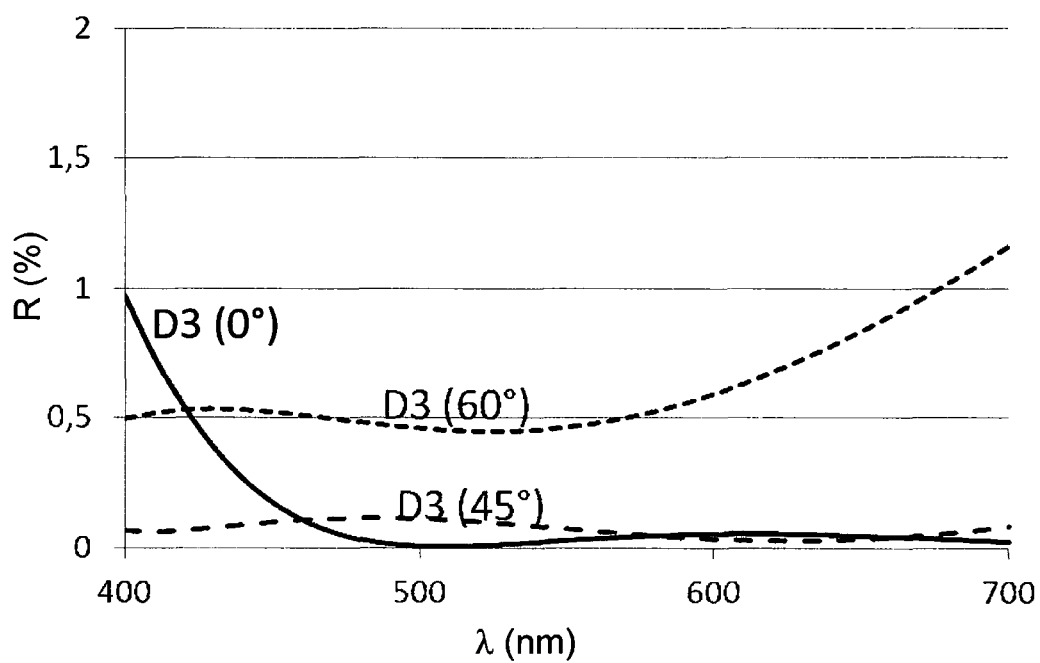
FIG. 8 shows a graph of reflection spectra at different angles of incidence of light for a further exemplary embodiment of the antireflection coating on a planar substrate.

For design D3, FIG. 8 shows the reflection R as a function of the wavelength λ for three different angles of incidence of light of 0°, 45° and 60° when using a planar substrate made of quartz glass with $n_s$=1.47.

The reflection spectra depicted in FIGS. 5 to 8 make it clear that the antireflection coating produced by the method described herein has a particularly low residual reflection, even at positions on curved substrates at which there are reduced layer thicknesses due to an increased angle of incidence of vapor during the coating process. Furthermore, the antireflection coating produced by the method is also advantageous for planar substrates if a particularly low residual reflection is to be obtained in the case of large angles of incidence of light, for example, in the case of angles of incidence of up to 80°, and/or over a large wavelength range, for example, from 400 nm to 1200 nm.

The invention is not restricted by the description on the basis of the exemplary embodiments. Rather, the invention encompasses any novel feature and also any combination of features, which in particular includes any combination of features in the patent claims, even if this feature or this combination itself is not explicitly specified in the claims or exemplary embodiments.

What is claimed is:
1. A method for producing an antireflection coating on a substrate, the method comprising:
   forming a first nanostructure in a first material using a first plasma etching process, wherein the first material is a material of the substrate or a material of a layer made of a first organic material applied onto the substrate;
   applying a layer made of a second material onto the first nanostructure, wherein the second material is an organic material; and
   forming a second nanostructure in the layer made of the second material using a second plasma etching process, wherein the second material has a higher etching rate than the first material when carrying out the second plasma etching process.

2. The method according to claim 1, wherein the first nanostructure has a depth of between 100 nm and 200 nm.

3. The method according to claim 1, wherein a refractive index gradient is generated in the first material by means of the first nanostructure such that the refractive index decreases with increasing distance from the substrate.

4. The method according to claim 1, wherein the first nanostructure has a mean effective refractive index $n_1$ of between 1.25 and 1.4.

5. The method according to claim 1, wherein the layer made of the second material is applied with a layer thickness of between 200 nm and 400 nm onto the first nanostructure.

6. The method according to claim 1, wherein the second nanostructure has a depth of between 100 nm and 200 nm.

7. The method according to claim 1, wherein a refractive index gradient is generated in the layer made of the second material by means of the second nanostructure such that the refractive index decreases with increasing distance from the substrate.

8. The method according to claim 1, wherein the second nanostructure has a mean effective refractive index $n_2$ of between 1.08 and 1.25.

9. The method according to claim 1, wherein the first nanostructure and/or the second nanostructure each have structure elements in the form of elevations, recesses and/or pores, the width of which on average is less than 150 nm.

10. The method according to claim 1, further comprising applying an etch stop layer onto the first nanostructure before applying the layer made of the second material, wherein the etch stop layer has a thickness of no more than 30 nm.

11. The method according to claim 1, further comprising applying a protection layer onto the second nanostructure after generating the second nanostructure, wherein the protection layer has a thickness of no more than 30 nm.

12. The method according to claim 1, wherein the first material is the material of the substrate and the substrate comprises PMMA, polycarbonate, a cycloolefin, polyamide or PTFE.

13. The method according to claim 1, wherein the first material is the material of a layer made of a first organic material applied onto the substrate.

14. The method according to claim 1, wherein the substrate is a curved substrate.

15. The method according to claim 1, wherein the substrate has a refractive index $n_s < 1.7$.

* * * * *